Aug. 5, 1969 YUNG SHING HSU ET AL 3,459,095
FASTENING STRUCTURE
Filed Sept. 28, 1967
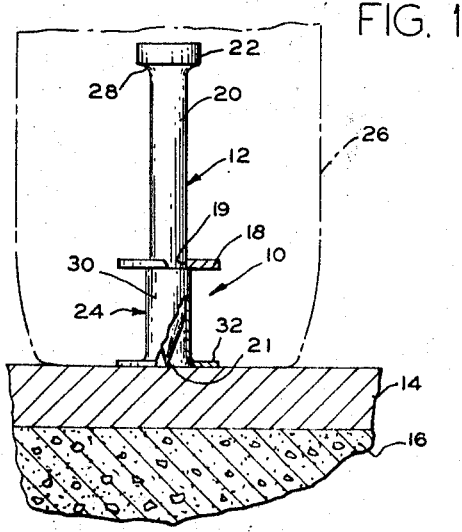
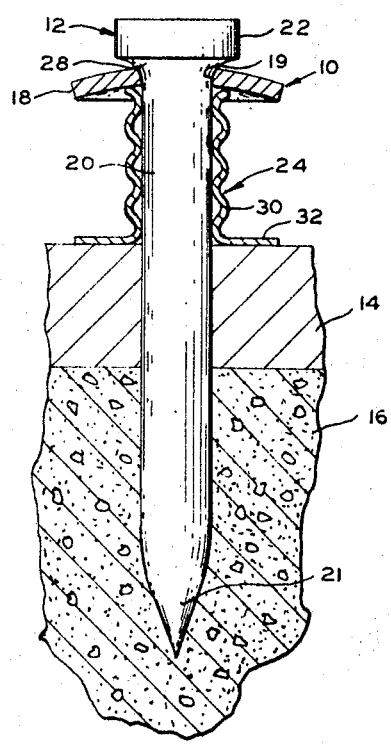
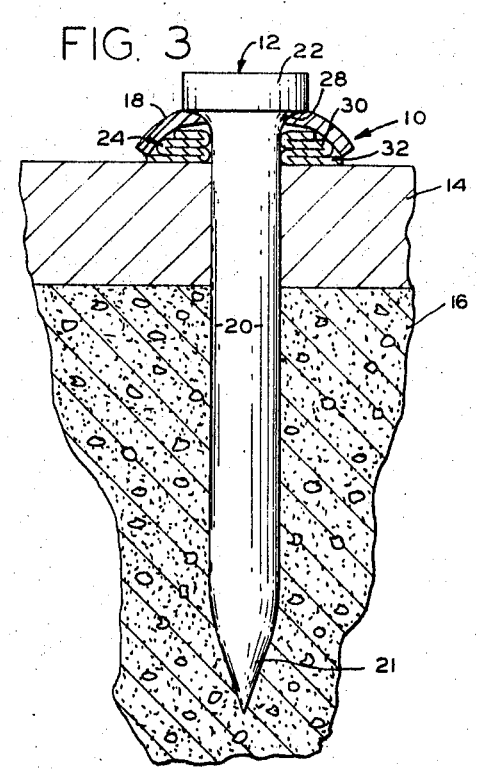
YUNG SHING HSU
JOHN P. LUCIANO, JR.
INVENTORS.
BY
BUCKHORN, BLORE, KLARQUIST & SPARKMAN
ATTORNEYS

United States Patent Office 3,459,095
Patented Aug. 5, 1969

3,459,095
FASTENING STRUCTURE
Yung Shing Hsu, Milwaukie, and John P. Luciano, Jr., Gresham, Oreg., assignors to Omark Industries, Inc., Portland, Oreg., a corporation of Oregon
Filed Sept. 28, 1967, Ser. No. 671,311
Int. Cl. F16b 15/00, 43/00
U.S. Cl. 85—10                                                9 Claims

ABSTRACT OF THE DISCLOSURE

A fastening structure includes a washering system 10 serving both to prevent overdriving of a pin 12 and to compensate for underdriving of the pin so that a plate 14 is firmly held against a base 16. The washering system includes an initially flat metal washer 18 having a hole 19 fitting closely on a shank 20 of the pin and positioned between a head 22 of the pin and a collapsible metal sleeve or eyelet 24. When the pin is driven by a powder actuated tool 26, a filleted portion 28 of the pin is forced into hole 19 in the washer to cup the washer downwardly and to compress in a pleated or accordian-like manner an initially cylindrical sleeve portion 30 of the eyelet 24. If the pin is underdriven, the sleeve portion 30 is only partially compressed as shown in FIG. 2 but holds the plate 14 tightly against the base 16. If the pin is fully driven or overdriven, the sleeve portion 30 is fully compressed against flange 32 thereof as shown in FIG. 3 and is substantially completely enclosed in the cupped washer 18.

---

This invention relates to a fastening structure and more particularly to a fastening structure including a washering system for a powder actuated tool driven pin.

Headed pins driven by powder actuated tools have been used successfully to secure members together, as for example, to hold a metal plate against a concrete base with the pin perforating the plate and driven into the base. However, such pins are underdriven, they do not hold the members tightly together, and when the pins are overdriven, undesirable deformation of the heads of the pins and of the members occurs. Sleeve-like metal washer elements have been used on the pins with the sleeves corrugating as the pins are driven to remove any slack of underdriving and to mitigate the effects of overdriving. However, such washer elements have tended to split longitudinally during driving of the pins to greatly weaken the washer elements. It would be desirable to provide a strong washering system for a pin driven by a powder actuated tool and which is not weakened by driving of the pin.

An object of the invention is to provide a new and improved fastening structure.

Another object of the invention is to provide a new and improved fastening structure including a washering system for a powder actuated tool driven pin.

A further object of the invention is to provide a fastening structure including a strong washering system serving with a drive pin to hold a plurality of members together regardless of whether the drive pin is underdriven or overdriven.

The invention provides a fastening structure including a washering system for a pin driven by a powder actuated tool wherein a cupped washer adjacent the head of the pin engages the end of a sleeve-like member under compression between the washer and a first member secured to a second member by the pin which extends through the first member and into the second member.

A complete understanding of the invention may be obtained from the following detailed description of a fastening structure forming a specific embodiment thereof, when read in conjunction with the appended drawings, in which:

FIG. 1 is a partially sectional elevation of a fastening structure forming one embodiment of the invention at the start of its installation;

FIG. 2 is a partially sectional elevation of the fastening structure of FIG. 1 in an underdriven installed condition; and FIG. 3 is a partially sectional elevation of the fastening structure of FIG. 1 in an installed condition.

Referring now in detail to the drawings, a fastening structure forming one embodiment thereof and shown therein includes a washering system 10 and a headed drive pin 12 which tightly secure a steel plate 14 to a concrete base 16 with a pointed end 21 of a shank 20 of the pin perforating the plate and being driven into and anchored in the base 16. A head 22 of the pin engages a steel washer 18 which, when the pin is driven by a known powder actuated tool 26, is cupped from an initially flat condition shown in FIG. 1 and corrugates to contract a sleeve portion 30 of a metal eyelet or compression member 24 having a base or flange 32. The pin has an outwardly flaring or filleted portion 28 at the juncture of the head 22 and shank 20, and it is the expansion of the hole 19 by the filleted portion 28 during driving of the pin that cups the washer 18.

To strongly fasten the plate 14 to the base 16, the tool 26 and the pin with the flat washer 18 and the eyelet 24 which fit closely on the shank 20, are placed on the plate 14 in the positions thereof shown in FIG. 1. The tool then is actuated to explode a charge therein and the pin 22 is driven through the plate 14 and deeply into the base 16 to perforate the plate 14 and anchor the shank of the pin in the base. As the pin is so driven, the shank 20 first slides through the washer 18 and the eyelet 24, then the filleted portion 28 of the pin enters and taperingly expands the washer 18 to cup it downwardly, and simultaneously with the cupping the washer 18 is moved toward the plate 14 to longitudinally compress and corrugate or pleat the sleeve portion 30 of the eyelet 24, as illustrated in FIG. 2. If the charge is of full or excessive strength, the pin 12 is driven to the position thereof shown in FIG. 3 in which the washer 18 has a maximum cupping and tightly compresses the completely corrugated sleeve portion 30 of the eyelet. If, however, the charge was on the light side, the pin 12 is underdriven and stops in the position thereof shown in FIG. 2 or a position between the positions shown in FIGS. 2 and 3. The sleeve 30 is under compression in any of these positions from that of FIG. 2 to that of FIG. 3 and strongly holds the plate 14 against the base 16. The washer 18 serves to compress and corrugate the sleeve portion 30 without splitting the sleeve portion so that the compressive force of the sleeve portion 18 is not reduced as would occur if splitting occurred. The washer 18 provides a large overhang to engage the upper end of the sleeve portion, to fully overhang the eyelet and to provide a large area to stop overdriving of the pin.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a fastening structure,
   a drive pin having a shank, an enlarged head and a tapered portion of a predetermined length joining the shank to the head,
   a substantially flat washer on the shank and having an internal diameter such that entrance of the tapered portion into the washer will cup the washer away from the head,
   the washer having a predetermined outer diameter and a predetermined thickness,
   and an elongated compression member on the shank having a sleeve-like portion engaging the side of the washer opposite to the side of the washer next to the head and of an external diameter substantially less than that of the washer, the sleeve-like portion having a length several times as great as the thickness of the washer and sufficinet to permit cupping of the washer by the pin when the pin is driven.

2. The fastening structure of claim 1 wherein the tapered portion is a fillet.

3. The fastening structure of claim 1 wherein the compression member comprises a metal sleeve fitting closely on the shank and adapted to be compressively engaged and corrugated by the washer.

4. The fastening structure of claim 1 wherein the compression member comprises an annularly corrugated metal sleeve compressively engaging the washer.

5. The fastening structure of claim 1 wherein the drive pin includes a fillet joining the head and the shank, and the washer fits closely on the shank and is adapted to be cupped when the filleted portion is forced into the washer.

6. The fastening structure of claim 5 wherein the compression member comprises a metal sleeve adapted to be annularly corrugated when compressed longitudinally by the washer.

7. The fastening structure of claim 1 wherein the compression member comprises a metal sleeve adapted to be annularly corrugated when compressed longitudinally by the washer.

8. The fastening structure of claim 7 wherein the compression member includes a radial flange at the end thereof remote from the washer.

9. The fastening structure of claim 8 wherein the external diameter of the washer is sufficient to fully cover the compression member when the pin has been driven to corrugate the sleeve-like portion and cup the washer.

References Cited

UNITED STATES PATENTS

| | | | |
|---|---|---|---|
| 2,660,084 | 11/1953 | Newman | 85—38 |
| 2,769,606 | 11/1956 | Larson | 151—38 |
| 2,855,817 | 10/1958 | Kopf. | |
| 2,990,739 | 7/1961 | Zifferer | 85—10 |
| 3,153,971 | 10/1964 | Lovisek | 151—38 |
| 3,320,845 | 5/1967 | Eschweiler. | |
| 3,382,751 | 5/1968 | Kopf | 85—10 |

EDWARD C. ALLEN, Primary Examiner

U.S. Cl. X.R.

85—50